Jan. 26, 1960     S. YANDO     2,922,967

DELAY LINE

Filed Oct. 19, 1956

CONTROL VOLTAGE

TRANSVERSE ELECTRIC FIELD DISTRIBUTION IN UNIT 14

INVENTOR
STEPHEN YANDO
BY
Theodore Jayk
ATTORNEY

United States Patent Office 2,922,967
Patented Jan. 26, 1960

2,922,967

DELAY LINE

Stephen Yando, Huntington, N.Y., assignor, by mesne assignments, to Sylvania Electric Products Inc., Wilmington, Del., a corporation of Delaware Application October 19, 1956, Serial No. 617,036

4 Claims. (Cl. 333—30)

My invention relates to signal delay lines and more particularly relates to ultrasonic delay lines wherein the signal to be delayed is an ultransonic energy beam.

Signal delay lines find a wide range of application in numerous electronic arts. The purpose of a delay line is to delay signal transmission for a predetermined period of time by reducing the velocity of signal propagation and/or by lengthening the signal transmission path.

One type of signal delay line which is frequently used to delay electrical signals is known as an ultrasonic delay line. In this type of device, an electrical signal is first transformed by a first transducer into an ultrasonic energy beam; the beam is then propagated along a given path to a second transducer; and the second transducer transforms the beam into an electrical signal. Insofar as I am aware, all ultrasonic delay lines introduce a fixed time delay; i.e. the path length of the ultrasonic beam is fixed and constant, and the propagation velocity of the beam is also fixed and constant. In contradistinction, I have invented an ultrasonic delay line in which the path length of the ultrasonic beam is varied in accordance with the variations of a variable control signal and hence, the signal delay period of the line also varies in accordance with the control signal.

Accordingly, it is an object of the present invention to vary the length of an ultrasonic beam in an ultrasonic delay line in accordance with the variations of a control signal.

Another object is to improve ultrasonic delay lines through the provision in the line of means to vary the length of the beam transmission path in accordance with the variations of a control signal.

Still another object is to provide a new and improved ultrasonic delay line characterized by an ultrasonic beam transmission path of variable length.

These and other objects of my invention will either be explained or will become apparent hereinafter.

In accordance with the principles of my invention, an energy carrying beam, as for example an ultrasonic energy beam, is constrained to travel in a suitable transmission medium between first and second spaced apart locations, the length of the beam transmission path being variable. Beam path controlling means, inserted in the medium between the two locations and responsive to a variable control voltage, vary the length of said path in accordance with the variations of the control signal.

I have also discovered that, when the ultrasonic beam impinges upon the beam path controlling means with a given angle of entry and emerges from said means with a variable angle of exit, the length of the beam transmission path can be varied in accordance with variations in the angle of exit. Under these conditions the control signal can be used to vary the angle of exit and hence vary the length of the beam transmission path.

Illustrative embodiments of my invention will now be described with reference to the accompanying drawings wherein Figs. 1, 2 and 3 are respective top, side and bottom views of one embodiment of my invention;

Figure 1:
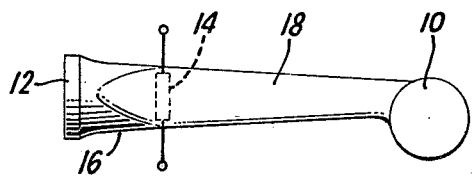
Figure 2:
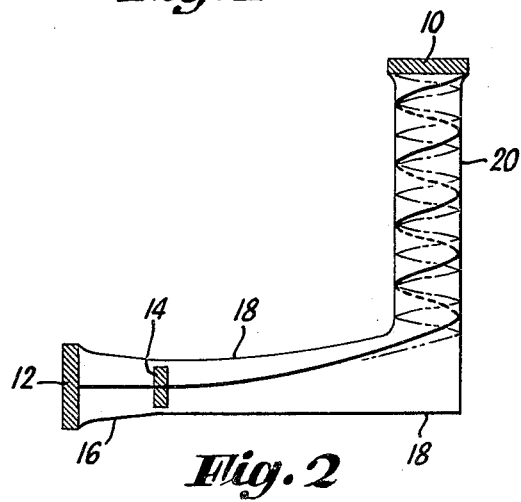
Figure 3:
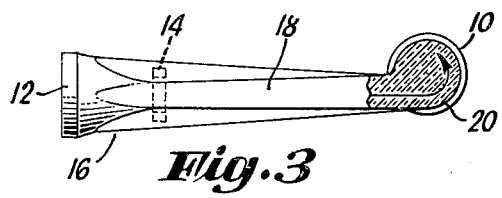

Referring now to Figs. 1, 2 and 3, there are shown two conventional piezo-electric transducers 10 and 12, transducer 10 being a receiver which converts an ultrasonic beam into an electrical signal and transducer 12 being a transmitter which converts an electrical signal into an ultrasonic beam.

Figure 4:
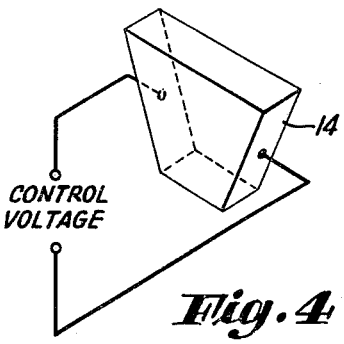
Fig. 4 is an enlarged isometric view of one element utilized in the embodiment of Figs. 1, 2 and 3.

The ultrasonic beam produced by the transmitter transducer 12 is guided along a first sonic transmission element 16 formed for example of fused silica or other suitable known sonic transmission medium having low attenuation characteristics to an ultrasonic beam refractor 14 (shown in more detail in Fig. 4). After passing through refractor 14, the beam travels through a second sonic transmission element 18 and a third rod shaped sonic transmission element 20, to the receiver transducer 10.

Figure 5:
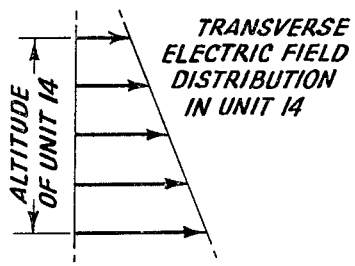
Fig. 5 illustrates the electric field distribution within the element of Fig. 4.

Beam refractor 14 is trapezoidally shaped and is formed from a piezo-electric material (as for example a quartz crystal), of the type whose density can be varied by application of an electric field. For this purpose, a pair of electrodes are affixed to the sloping sides of the refractor 14 and a control voltage is applied thereacross. For any given applied voltage, an electric field gradient of the type shown in Fig. 5 is established within refractor 14; this gradient produces a corresponding gradient in density within the refractor 14.

An electrical signal which is to be delayed in accordance with the control voltage described above is modulated upon a high frequency carrier to produce a modulated input signal. This signal is applied to the transmitter transducer 12 and is converted therein to an ultrasonic beam. The beam is guided through element 16 to refractor 14 wherein the beam is refracted (because of the variable density of refractor 14) to an extent which is proportional to the density gradient of refractor 14 and hence which is proportional to the control voltage.

By virtue of the physical relationship and connection of elements 18 and 20, the beam always enters element 20 along a path tangent to this wall. Tangential reflection (or straight line bounce reflection which approximates a tangential path) carries the beam to the top of element 20 wherein the beam strikes the receiving transducer 12 and is converted to a modulated electrical output signal. As will be apparent, the output signal has been delayed relative to the input signal by a period of time proportional to the length of the path of the beam through the sonic transmission medium.

By virtue of the tangential entry of the beam into element 20, the beam describes an essentially helical path therein. However, the length of the beam path in element 20 is dependent upon the hedical pitch angle which in turn is a function of the beam refraction angle established by reflector 14 under the influence of the control voltage.

As the helical pitch angle varies, the length of the beam path through element 20 also varies and the signal delay period is varied accordingly. Furthermore, as the density of the refractor 14 is varied, under the influence of the control voltage, the helical pitch angle is varied accordingly. Hence, the amount of signal delay varies in accordance with the control voltage.

Figure 6:
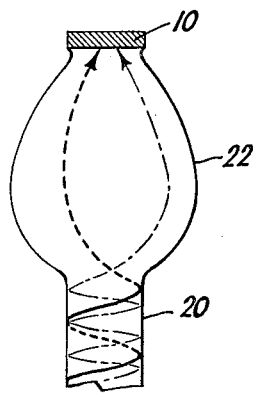
Fig. 6 shows a modification of the embodiment of Figs. 1, 2 and 3.

The angle of incidence of the beam as it strikes transducer 10 will vary depending upon the helical pitch angle. This variation can be prevented for example as shown in Fig. 6, wherein a fourth sonic transition element 22 shaped into the form of a truncated minaret and interposed between the rod shaped element 20 and transducer 10 serves to focus the beam upon transducer 10. If the dimensions of element 22 are properly adjusted, the beam will always strike transducer 10 with a substantially constant angle of incidence.

The various transmission elements are suitably contoured to establish smooth transitions between the transducers and the refractor and thus prevent spurious signals and undesired beam reflections.

Figure 7:
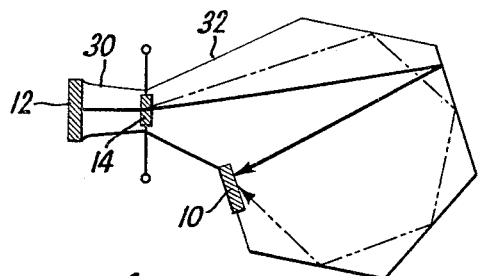
Fig. 7 shows a second embodiment of my invention.

Fig. 7 shows a second embodiment of my invention which as before includes transducers 10 and 12, and refractor 14. However, in this figure, the elements 18 and 20 shown in Figs. 1–3 and 6, are replaced by a polygonal sonic transmission element 32 and transmission element 16 shown in Figs. 1–3 and 6 is replaced by another transmission element 30.

The variation in path length obtained by the structure of Fig. 7 is accomplished by varying the beam refraction angle in the same manner as before. However, in Fig. 7 the beam does not travel in a helical path, but rather is reflected in straight lines falling in a common plane, the number of reflections from the various surface walls of element 32 determining the amount of signal delay. Of course, the number of reflections as indicated by the two beam paths shown in Fig. 7 are determined by the angle of refraction of the ultrasonic beam.

While I have shown and pointed out my invention as applied above, it will be apparent to those skilled in the art that many modifications can be made within the scope and sphere of my invention as defined in the claims which follow.

What is claimed is:

1. In a device wherein an ultrasonic energy beam passes between first and second spaced apart positions, a cylindrically spaced element interposed between said first and second positions, said beam propagating within said element in a helical path substantially tangent to its cylindrically shaped wall, the time of passage of said beam through said element varying with the pitch of said helical path, said time increasing as the pitch decreases; beam guiding first means interposed between said first position and said element to direct said beam into said element along a path substantially tangential to said cylindrically shaped wall, the angle of entry of said beam into said element being variable; and second means interposed between said first position and said first means, said second means being responsive to an applied variable control signal to vary accordingly said angle of entry whereby the time of passage varies in accordance with said control signal.

2. In combination, an elongated ultrasonic energy beam transmission element having a cylindrically shaped outer surface, an ultrasonic beam, when introduced into one end of said element with a variable angle of entry which is always substantially tangent to said surface, propagating through said element in a helical path, the length of said path increasing as the angle of entry increases; and means coupled to said one end to introduce said beam into said element with said variable angle of entry, said means being responsive to an applied variable control signal to vary said angle of entry whereby the length of the helical path is varied in accordance with said control signal.

3. In a device wherein an ultrasonic energy beam passes between first and second spaced apart positions, a cylindrically shaped first element interposed between said first and second positions, said beam propagating within said first element in a helical path substantially tangent to its cylindrically shaped wall, the time of passage of said beam through said first element varying with the pitch of said helical path, said time increasing as the pitch decreases; beam guiding first means interposed between said first position and said first element to direct said beam into said first element along a path substantially tangential to said cylindrically shaped wall, the angle of entry of said beam into said first element being variable; and a second element having a variable density gradient and interposed between said first position and said first means, said second element being responsive to an applied variable control signal to vary accordingly said density gradient and thereby refract said beam at an angle depending upon said gradient, said helical pitch being dependent upon said refraction angle, whereby the time of passage varies in accordance with said control signal.

4. In combination, an elongated ultrasonic energy beam transmission element having a cylindrically shaped outer surface, an ultrasonic beam, when introduced into one end of said element with a variable angle of entry which is always substantially tangent to said surface, propagating through said element in a helical path, the length of said path increasing as the angle of entry increases; and means coupled to said one end to introduce said beam into said element with said variable angle of entry, said means comprising a trapezoidal shaped piezoelectric crystal responsive to an applied variable control signal to vary said angle of entry whereby the length of the helical path is varied in accordance with said control signal.

References Cited in the file of this patent

UNITED STATES PATENTS

| | | |
|---|---|---|
| 2,213,307 | Elliott | Sept. 3, 1940 |
| 2,308,360 | Fair | Jan. 12, 1943 |
| 2,435,601 | Ramo | Feb. 10, 1948 |
| 2,525,873 | De Lano | Oct. 17, 1950 |
| 2,703,867 | Arenberg | Mar. 8, 1955 |
| 2,837,959 | Saunderson et al. | June 10, 1958 |